United States Patent
Dudley et al.

(10) Patent No.: US 6,895,739 B2
(45) Date of Patent: May 24, 2005

(54) CHAINS

(75) Inventors: Roger Dudley, Stourport-on-Severn (GB); Lakbir Ghaman, Wolverhampton (GB)

(73) Assignee: Parsons Chain Company Limited, Stourport-on-Severn (GB)

( * ) Notice: Subject to any disclaimer, the term of this patent is extended or adjusted under 35 U.S.C. 154(b) by 0 days.

(21) Appl. No.: 10/472,344

(22) PCT Filed: Mar. 25, 2002

(86) PCT No.: PCT/GB02/01425

§ 371 (c)(1),
(2), (4) Date: Sep. 22, 2003

(87) PCT Pub. No.: WO02/076869

PCT Pub. Date: Oct. 3, 2002

(65) Prior Publication Data

US 2004/0093848 A1 May 20, 2004

(30) Foreign Application Priority Data

Mar. 23, 2001 (GB) .............................. 0107331

(51) Int. Cl.⁷ ............................ F16G 15/12; B66C 1/12
(52) U.S. Cl. ................... 59/78; 59/90; 59/93
(58) Field of Search ............................. 59/78, 80, 90, 59/93

(56) References Cited

U.S. PATENT DOCUMENTS 2,650,470 A * 9/1953 Sennholtz ...................... 59/78
2,966,878 A * 1/1961 Feiser, Jr. ...................... 59/90
4,627,232 A * 12/1986 Bruce ............................ 59/78

FOREIGN PATENT DOCUMENTS

DE 3929148 * 1/1991

* cited by examiner

*Primary Examiner*—David Jones
(74) *Attorney, Agent, or Firm*—Fulwider Patton Lee & Utecht, LLP

(57) ABSTRACT

A chain comprises links formed from bar stock having a specific cross-section. In a preferred embodiment, which is a chain of 16 mm size, the cross-section comprises four convex arcuate sides (10a), (10b), (10c) and (10d), each of which has a radius of curvature at least 10% greater than the chain size (i.e. at least 10% greater than 8 mm) and preferably at least 15% greater than the chain size. In this way, a chain is produced which has the profile which is similar to the profile attained by the chain after a significant period of wear, involving a significant increase in the surface-to-surface contact between adjacent links, reducing the effective wear rate, and reducing the rate of effective lengthening of the chain due to wear.

9 Claims, 6 Drawing Sheets

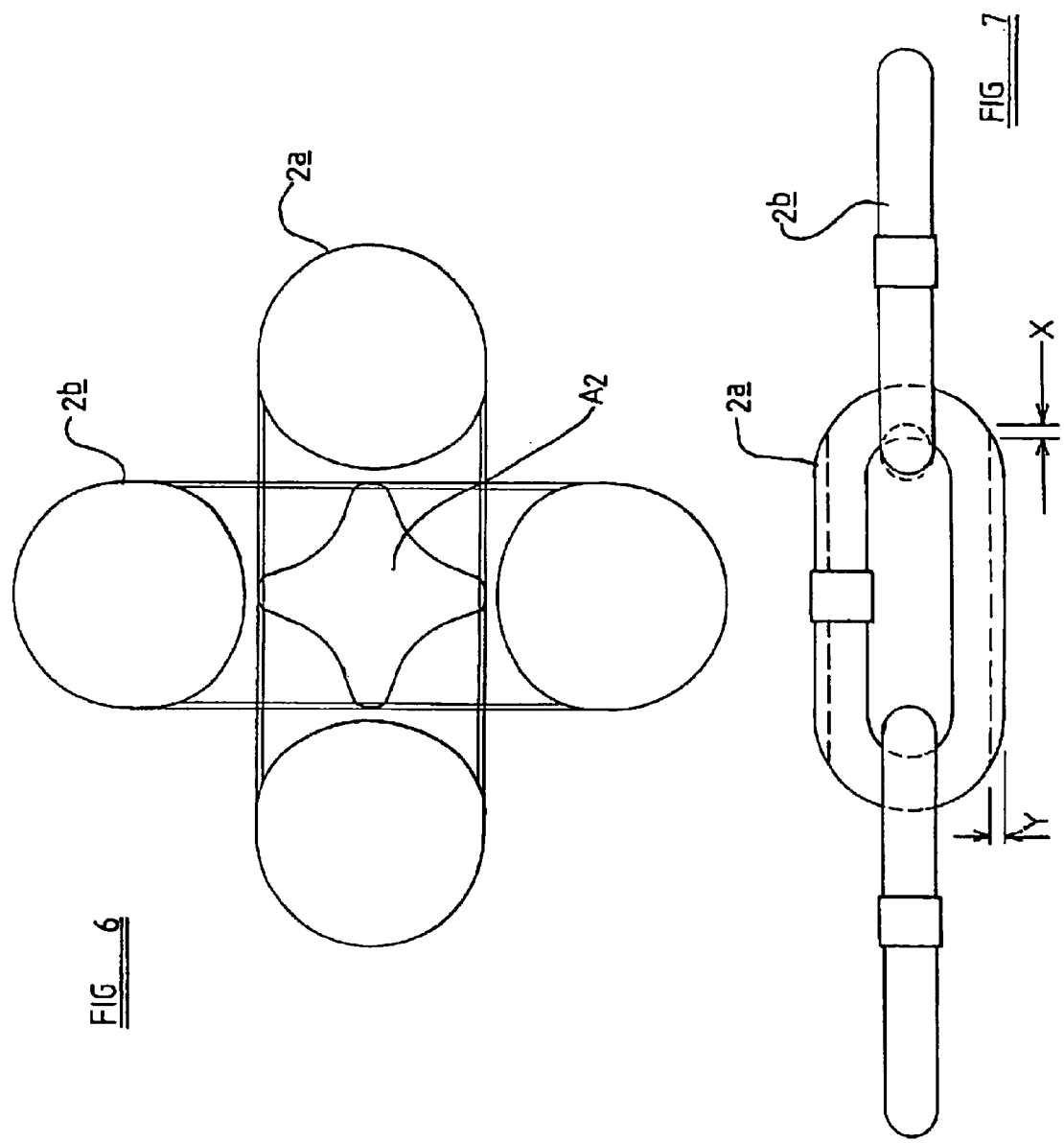

CHAINS

RELATED APPLICATIONS

This is a U.S. national phase of PCT/GB02/01425 filed 25 Mar. 2002, claiming priority from GB 0107331.1 filed Mar. 23, 2001.

DESCRIPTION OF INVENTION

This invention is concerned with improvements relating to chains, as are used (for example) to haul loads or to operate machinery. The links of such a chain are conventionally produced by welding, or, infrequently, by a combination of welding or forging. Usually all the links in a chain are welded but occasionally alternate forged links may be connected together by welded links.

Conventionally such links are generally circular in cross-section, and the contact between inter-connecting links when under load is theoretically point contact, in practice extending over a small, generally circular, area.

Thus, forces which are transmitted between adjacent links, at least in an early stage in the life of the chain, through the small areas of contact, produce high stresses on the chain links.

Additionally, because the area of contact is small, chain links rapidly abrade at the area of contact, the rate of reduction in the diameter of the chain decreasing as the area of contact between the links increases.

Such wearing of the chain links has the disadvantage, that whilst the reduction in the diameter of the chain links in the radial direction ("radial abrasion") is small compared with the diameter of the chain links themselves, over an extensive length of chain this may require re-tensioning the chain after only a small period of initial use.

According to this invention there is provided a chain, some at least of the links of which are provided ab initio with a profile over an operative part of its surface which is similar to that attained by a link after a period of use.

In this manner, contact between adjacent links will ab initio be over a relatively large area, reducing the rate of radial abrasion of the chain, compared with a new chain of circular cross-section.

Preferably the chain in accordance with this invention has ab inito a cross-sectional area which is similar to that of a conventional chain. Thus, if for example a chain of 16 mm diameter is being produced in accordance with this invention, preferably the cross-sectional area of the chain is approximately 201 square mm, as would be with the conventional 16 mm diameter chain.

Thus bar stock of circular cross-section for the conventional chain may be deformed into a cross-section which provided significantly higher surface area contact between two adjacent links of the chain, particularly in the crown areas. In this manner the advantages are achieved of initially higher surface to surface contact with out any reduction in the strength of the chain.

Thus the chain has the reduced stretch properties of a worn chain, whilst having the strength properties of an unworn chain.

Alternatively by initially ensuring that the chain has a cross-section such as to produce a desired safe working load, this may be smaller than would otherwise be necessary, when taking into account the reduction in the strength of the chain which is initially produced, due to abrasion.

The surface profile of the chain may be a reproduction of the surface profile of a conventional link after a period of use, for example, an extensive period of use, and in consequence after extensive wear has taken place.

Such a profile may be provided on the inner faces of the crowns only of the chain links, and may if desired by provided on alternate links only.

Thus, if desired forged links may be produced with an inner surface on the crown thereof which sits in face-to-face (areal) engagement with the intervening (e.g. welded) links. Thus, these forged links may initially be produced in conventional manner, for example by forging to a generally circular cross-section, and may then be upset at the crown regions to produce the desired surface profile.

Preferably however the design surface profile is provided to the welded links, and conveniently is provided over the whole of the length of the links, including the outer surfaces of the links, e.g. on the shanks or legs thereof. In this manner wear as takes place over other areas of the chain during use, e.g. by wearing contact with a conveyor pan or ground surface, may also be reduced.

In this manner stock of a constant cross-section, which includes the desired profile, may be cut, formed and welded to produce links in accordance with this invention.

Conveniently in such circumstances the stock is provided with a desired surface profile on at least two, preferably four opposed surfaces, enabling the link to be formed in accordance with this invention irrespective of the axial orientation of a cut length of stock.

According to this invention there is provided a chain, characterised in that some at least of the links are provided on the contact face thereof with a profile having a radius of curvature which is larger than that of the link as a whole.

By the phase "radius of curvature of the link as a whole" we mean the radius of curvature of the cross section of a circular link having comparable cross sectional area to the link in question.

The contact face is that face which in use engages the contact face of an adjacent link, and through which forces are transmitted in the use of the chain.

Thus, for a chain having links of 20X diameter (where X is a distance), the radius of curvature of the profile may be 12X or more, i.e., a 20% larger radius of curvature than would normally be the case, and is conveniently 15X or more, i.e. a 50% larger radius of curvature than would normally be the case. Thus, for a chain having links of 15 mm diameter, the contact face may have a profile having a radius of curvature of at least 10 mm, and preferably a radius of curvature of 12 mm or more.

Similarly for a chain having links of 28 mm diameter, the contact face may have a profile having a radius of curvature of 18 mm or more, preferably 22 mm or more.

The profile provided on the contact face may be provided at the crown of the links, perhaps solely at the crown of the links, or may be provided on the entire inner surface of the links.

Where the link is a welded link, the profile may be provided on the inner and outer surfaces, conveniently on two pairs of diametrically opposite faces.

According to this invention there is also provided a chain some at least of the links have a cross-section which is generally in the form of a squircle.

A squircle is a geometric shape, comprising four convex arcuate sides which meet at corner areas of the shape, in which the radius of curvature of the sides is larger than that of a circle of comparable cross-sectional area.

According to this invention there is also provided a chain link for a chain of the kind set out above.

According to this invention there is also provided bar stock for use in the manufacture of a chain link of the kind set out above.

According to this invention there is also provided a method of making a chain characterised by the steps of simulating on a computer an amount of wear on a link of a conventional chain, generating therefrom a surface profile of a worn chain; and manufacturing a chain having such a surface profile on at least the crown regions of some of the chain links.

The method may further comprise the steps of: computer modelling at least two links of a conventional chain; superimposing the two links into each other by an amount which simulates an amount of wear; calculating the cross section of the profile thus generated; and manufacturing chain links having on their crown regions at least a profile having this cross section.

There will now be given a detailed description, to be read with reference to the accompanying drawings, of a chain which is a preferred embodiment of this invention, having been selected for the purposes of illustrating the invention by way of example, the chain comprising a chain link which is also illustrative of the invention in certain of its aspects.

In the accompanying drawings

FIG. 6 is a view corresponding to FIG. 1, showing the area of contact between adjacent links of the chain which is the preferred embodiment of this invention;

FIG. 7 is a schematic view for use in conjunction with the tables appearing hereinafter.

Figure 2:
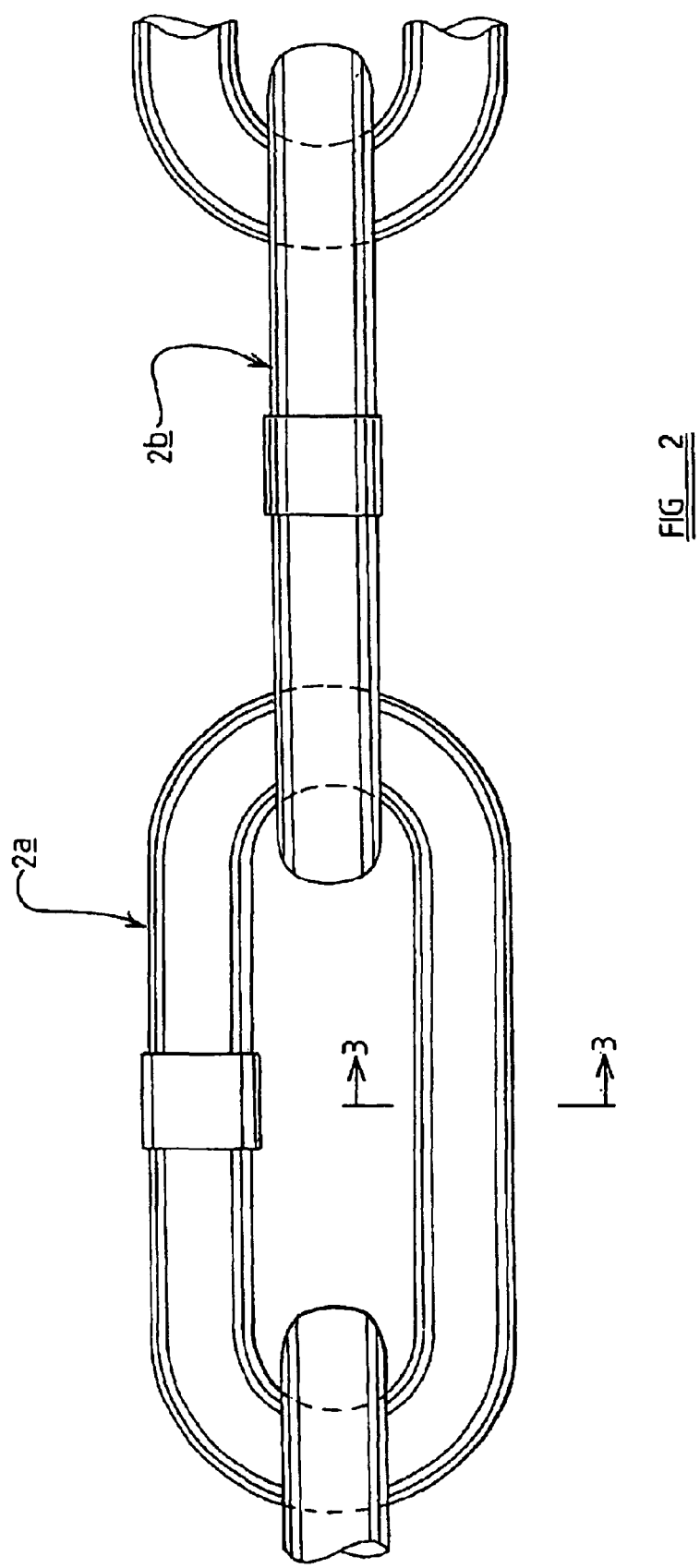
FIG. 2 is an elevational view showing part of a chain in accordance with this invention.
Figure 4:
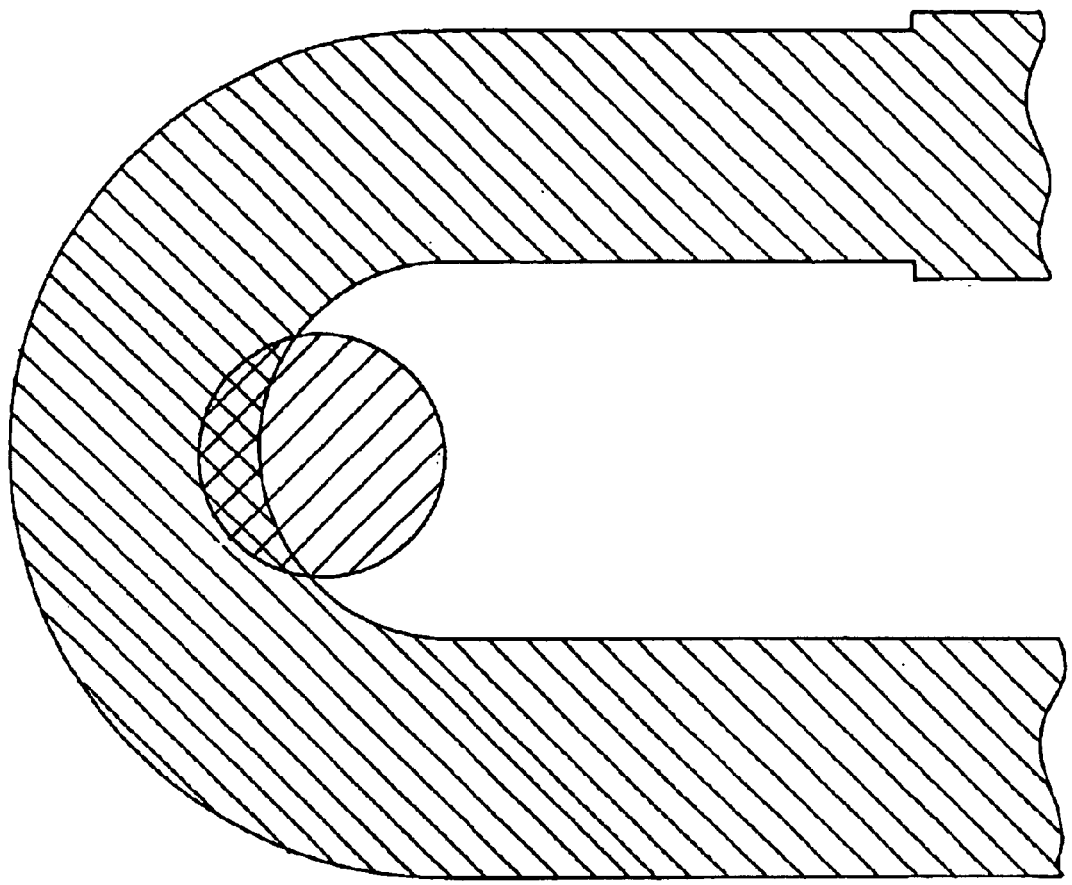
FIG. 4 is a schematic view of the interference between two links of conventional circular cross-section after 2 mm of wear.

The chain which is the preferred embodiment of this invention comprises a plurality of links, two of which, 2a and 2b are shown in FIG. 2, being a welded link chain. The links are formed from bar stock having a cross-section shown in FIG. 3, which is defined herein as being in the form of a "squircle". Specifically, the chain which is the preferred embodiment of this invention is a 16 mm chain, and the cross-section comprises four convex arcuate sides 10a, 10b, 10c and 10d each of which has a radius of curvature at least 10% greater than that of the chain size (i.e. at least 10% greater than 8 mm), and preferably at least 15 mm greater than the chain size. In the preferred embodiment, the convex arcuate surfaces 10a to 10 d have a radius of curvature of 13 mm, compared with the radius of curvature of a circle of comparable cross-sectional area, (i.e. 8 mm).

Figure 3:
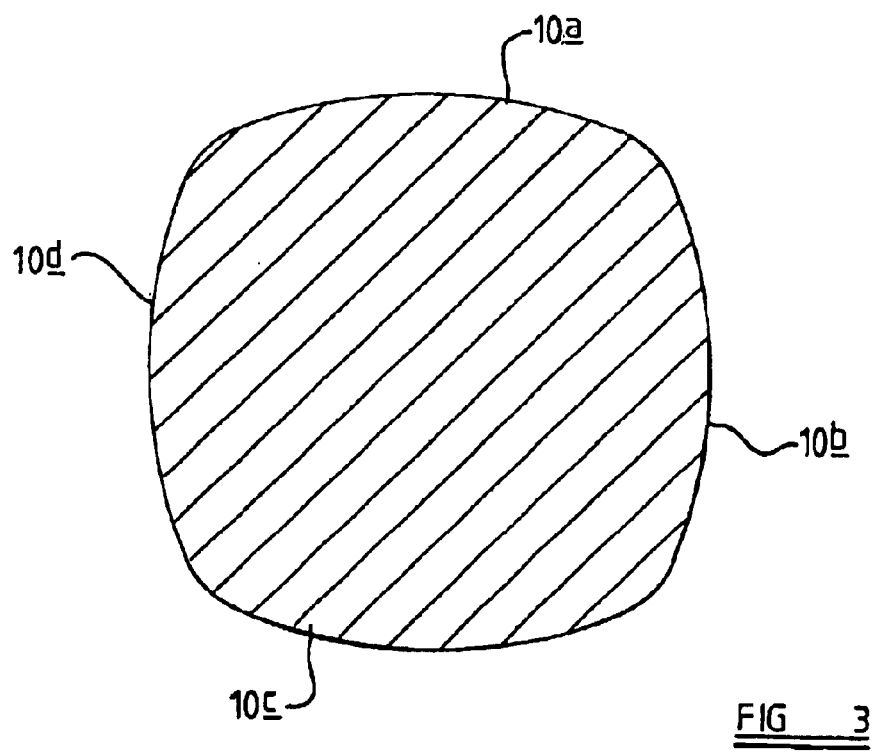
FIG. 3 is a cross-sectional view of the link shown in FIG. 2, taken on the line 3—3 of FIG. 2.

The surfaces 10a to 10d may meet at a point, but conveniently the junctions are rounded, as shown in FIG. 3.

The chain shown in FIG. 2 has a profile over an operative part of its surface which is equivalent to part of the surface profile of a conventional chain of circular cross-section after a period of wear. This surface profile may be generated as follows.

A 3-D solid modelling package, for example Pro-Engineer®, is used to create models of standard links with, for example, a conventional circular cross-section although any convenient profile could be used. The size and shape of the links simulated would be the values typically usually used for the application, and the radius of the links chosen accordingly. In this example conventional circular links having a radius of curvature of 8 mm are used.

These links are then "assembled together" in the computer simulation to form a two length chain with point contact between the links. To simulate the wear on the links the two links are superimposed into each other by steps of 0.1 mm, 0.5 mm, 1.0 mm, 1.5 mm and 2.0 mm. The amount of surface area of contact between the two links can be calculated by the computer package at each stage. Naturally the deeper the movement into the corresponding link the greater the surface contact area, as the chain wears away.

Initially, a new chain wears rapidly from a theoretical point contact until a seating is created between links, and it is this rapid initial wear which causes problems with chain lengthening. Once the profile of the contact areas between the links has been calculated it is possible to select an interference step and view the cross-section of the chain at this point. This corresponds to the cross-section of the chain after a period of wear. The exact amount of wear to which the surface profile corresponds depends on the value of the interference step chosen, and it is relatively easy to plot the changes in surface contact area at different interference steps and see from that how deep an interference is required to compensate for the rapid initial wear between chain links.

The cross-section for this embodiment was the result of modelling a 2.0 mm interference depth between two conventional circular chain links. The profile of the contact face of the links at this interference depth resembles, in the area that has been worn, one side of the squircular cross-section shown in FIG. 2 which has a radius of curvature which is considerably larger than that of a circle of comparable cross-sectional area. Thus manufacturing a link with a squircular cross section is a convenient way of using the results of the simulation to provide a chain with a pre-worn profile.

Two links with a squircular cross section can also be modelled on the computer in a similar fashion to that described above as shown in FIG. 5. The contact area between the two links is substantially greater than that between conventional circular cross-section links, as shown in Tables 1 and 2.

To manufacture links having this advantageous cross section, an appropriate length of bar stock is rolled to an appropriate, squircular, shape by rollers which have been formed into an appropriate cross section. The shape of the rollers is determined by the results of the computer simulation. The bar stock is then cut to length, dropped into a bending machine where the pieces are grasped between two jaws and rolled around a former into a link shape. During this process, a link can be formed as part of a chain. When all four faces are provided with an appropriate profile one of the surfaces 10a to 10d provides an inner contact face, which is engaged by the contact face of an adjacent link, as is shown in FIG. 2, irrespective of which of the four axial orientations the link adopts at the point of forming.

Other ways of forming the links are possible, but in general less advantageous. The bar stock may be extruded but this is expensive, or forged in dies which have been appropriately profiled by a CNC machine, but this requires alternate links to be forged and welded which is inconvenient in manufacture.

Figure 1:
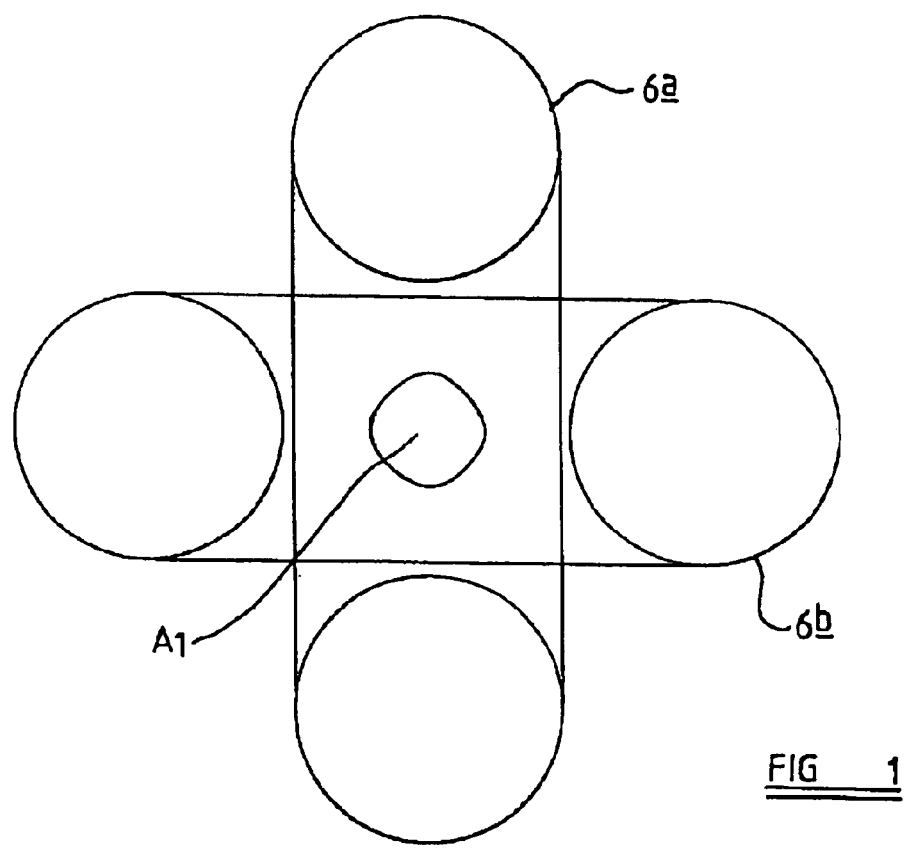
FIG. 1 is a schematic cross-sectional view showing the shape of the contact area between two links of a chain of conventional circular cross-section.
Figure 5:
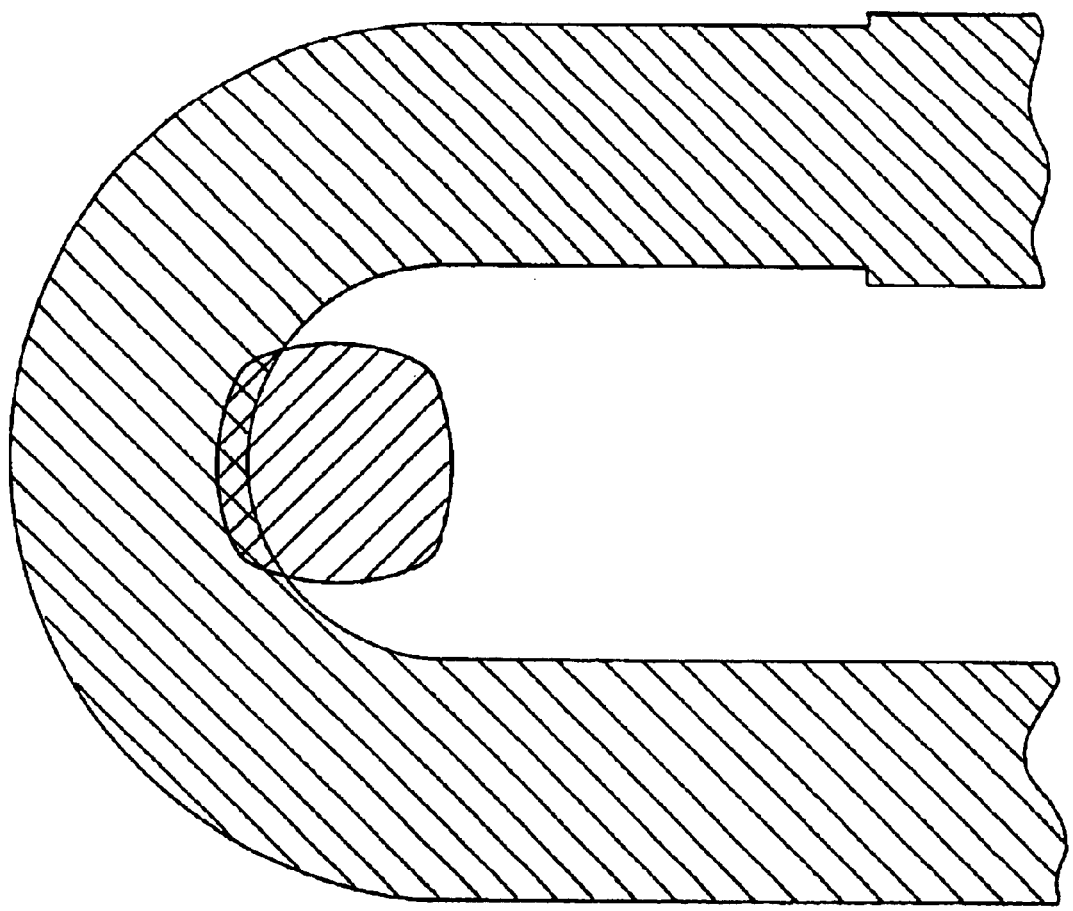
FIG. 5 is a corresponding view of the interference between two chain links according to the invention after 2 mm of wear.

FIG. 1 shows the contact area A1 between adjacent links 6a, 6b of a chain having links of conventional circular cross-section, after a short period of wear, whilst FIG. 6 shows the contact area A2 between two links 2a, 2b of a chain in accordance with the present invention, after a similar short period of wear, as will be seen from the following table, in which X is the erosion distance, indicated in FIG. 5.

TABLE 1

Surface Contact Area (16 mm)

| X Depth | Round Link | Profiled Link | % Increase |
|---------|------------|---------------|------------|
| 0.5 | 59 mm² | 218 mm² | 269 |
| 1.0 | 109 mm² | 254 mm² | 133 |
| 1.5 | 153 mm² | 279 mm² | 82 |
| 2.0 | 191 mm² | 298 mm² | 56 |

TABLE 2

Volume of Erosion (16 mm)

| X Depth | Round Link | Profiled Link | % Increase |
|---------|------------|---------------|------------|
| 0.5 | 14.7 mm³ | 71.1 mm³ | +383 |
| 1.0 | 54.2 mm³ | 161.3 mm³ | +197 |
| 1.5 | 112.7 mm³ | 259.7 mm³ | +130 |
| 2.0 | 186.6 mm³ | 364.5 mm³ | +95 |

Figure 8:
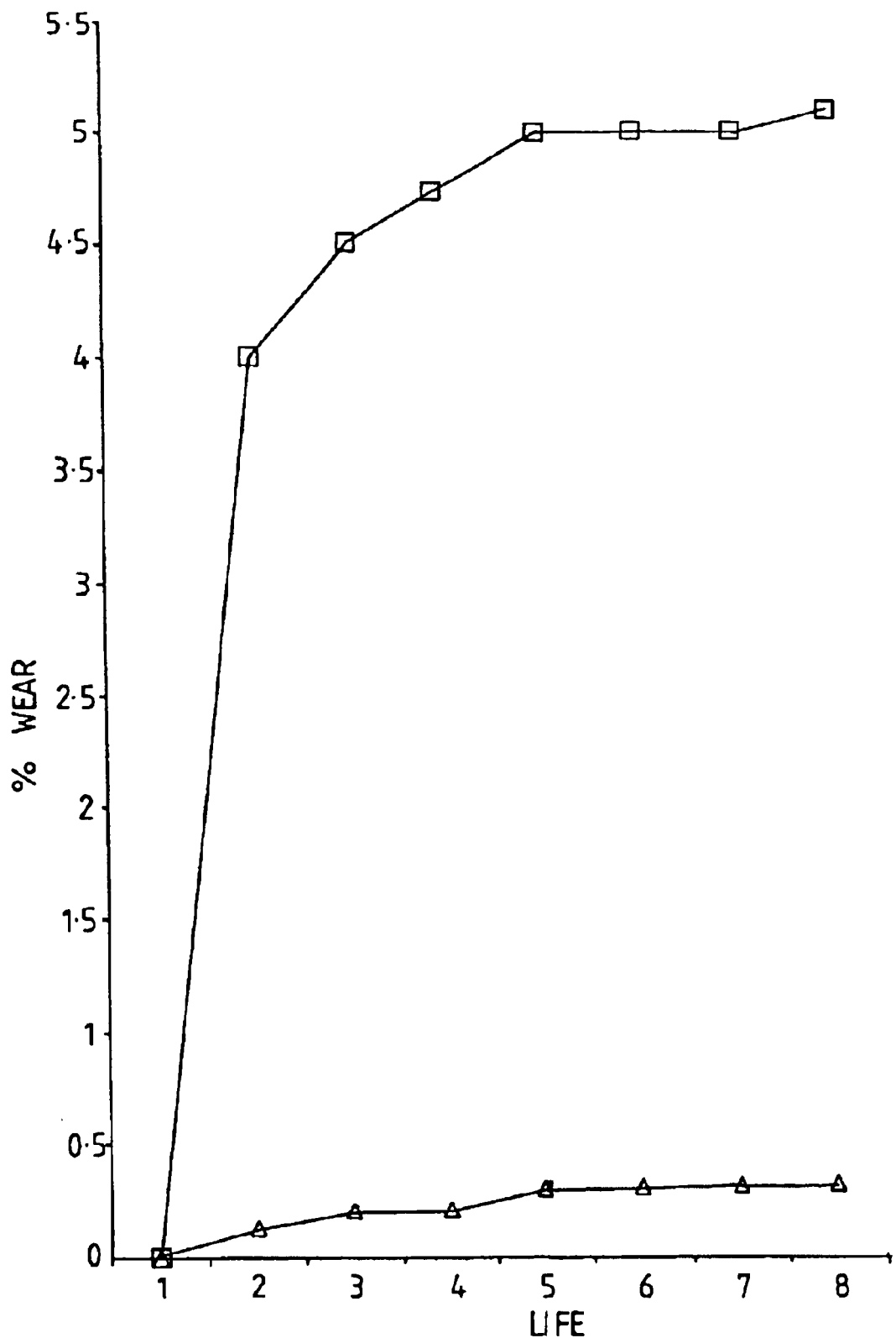
FIG. 8 is a graph showing the reduced rate of wear obtained by the use of the invention.

As will be seen from the figures given above, significantly increased wear is needed in a chain in accordance with this invention (the "profiled link") compared with the conventional, round link chain, reducing the rate of effective lengthening of a chain due to wear, and reducing the rate of decrease of the safe working load of the chain, due to radial erosion. The reduction in the rate of wear by the use of the invention is shown in FIG. 8.

Indeed, as far as stretching of the chain is concerned, it has been found that over most of the range, a 16 mm link in accordance with this invention will produce less stretch than a 20 mm conventional round link chain, over most of its life, as indicated in the following table:

TABLE 3

Volume of Erosion (16 mm)

| X Depth | Round Link (28 mm) | Profiled Link (16 mm) | % Increase |
|---------|--------------------|-----------------------|------------|
| 0.5 | 28.4 mm³ | 71.1 mm³ | +150 |
| 1.0 | 107.4 mm³ | 161.3 mm³ | +50 |
| 1.5 | 227.9 mm³ | 259.7 mm³ | +13 |
| 2.0 | 385.0 mm³ | 364.5 mm³ | −5 |

As far as will be seen from FIG. 8, the conventional chain shows a significant degree of wear over the first cycle of testing, for the reasons which have been explained above. Conversely, the rate of wear of the chain in accordance with this invention is very significantly less, and in effect commences at the point reached by the conventional chain, at the level of 4.75% wear, which corresponds approximately to the profile of a chain, on the inner faces of the crowns of the links, at an erosion depth of about 2 mm.

Although 90% of the advantage of the reduction in wear may be obtained by using the squircular profile only on the inside, contact, face of the chin link, there are advantages in metal utilisation of using the profile on all four sides. Additionally, by providing this profile over the whole of the chain, including the outer surfaces of the shanks of the links, the rate of reduction of the cross-sectional area of the chain in the shanks as may be caused by the chain wearing against exterior surfaces in use may also be decreased. An example of such wear is where a chain is utilised in a mining conveyor, and is dragged over a conveyor pan, or where it is dragged over a hard ground surface.

Thus, where Y is the irregular erosion distance (see FIG. 7) the following reduction in wear may be obtained:

TABLE 4

Volume of Erosion (16 mm)

| X Depth | Round Link | Profiled Link | % Increase |
|---------|------------|---------------|------------|
| 1 mm | 433.9 mm³ | 557.2 mm³ | 28 |
| 2 mm | 1256.0 mm³ | 1598.7 mm³ | 27 |
| 3 mm | 2332.2 mm³ | 2865.4 mm³ | 22 |
| 4 mm | 3604.0 mm³ | 4271.3 mm³ | 18 |

The invention has been described above in relation to a chain comprising welded links, formed from bar stock of constant cross-section, shown in FIG. 3, the chain specifically being of 16 mm size. It will of course be appreciated that the principles of the invention have advantages to both welded and forged links, and, particularly in relation for forged links, the profile may be provided on the interior contact surface of the chain link, and indeed at the interior surfaces of the crowns of the chain links alone.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A chain including a plurality of links, at least some of the links being formed from circular cross section stock which has been deformed at least over part of its surface into a non-circular cross section having four substantially similar convex arcuate sides.

2. A chain according to claim 1 wherein each link has a length and the cross section is provided over all of the length of the links.

3. A chain according to claim 1 comprising forged links, and wherein an operative part of a link comprises an inner surface on a crown thereof which sits in face-to-face engagement with intervening links, and each link after initial production is subsequently upset at the crown to produce the cross section.

4. A chain according to claim 1 wherein the chain has links of 20X diameter, and the radius of curvature of the profile is 12X or more, where x is a distance.

5. A chain according to claim 1 wherein the radius of curvature of the profile is 15X or more.

6. A chain according to claim 1 wherein the chain has links which have a diameter of 15 mm, and an operative part has the cross section having a radius of curvature of at least 10 mm, or at least 12 mm.

7. A chain according to claim 1 wherein the chain has links of 28 mm diameter, and an operative part has the cross section having a radius of curvature of at least 18 mm, or at least 22 mm.

8. A method of making a chain characterized by the steps:
(a) simulating on a computer an amount of wear on a link of a conventional chain;
(b) generating therefrom a surface profile of the link; and
(c) manufacturing a chain comprising chain links each of which has an inside surface and at least some of which chain links have the generated surface profile on at least the inside surfaces thereof.

9. A method according to claim 8 further comprising the steps of:
(d) computer modelling at least two links of a conventional chain;
(e) superimposing the two links into each other by an amount which simulates an amount of wear;
(f) calculating a cross section of the profile thus generated; and
(g) manufacturing chain links each of which has a crown region, and at least some of which chain links have the cross section of the generated profile on at least the crown regions thereof.

* * * * *

UNITED STATES PATENT AND TRADEMARK OFFICE
CERTIFICATE OF CORRECTION

PATENT NO.    : 6,895,739 B2  
DATED         : May 24, 2005  
INVENTOR(S)   : Roger Dudley and Lakbir Ghaman It is certified that error appears in the above-identified patent and that said Letters Patent is hereby corrected as shown below:

<u>Column 6,</u>
Line 58, delete "claim 1" and insert -- claim 4 --.

Signed and Sealed this

Thirtieth Day of August, 2005

JON W. DUDAS
*Director of the United States Patent and Trademark Office*